US006955294B1

(12) United States Patent
Seegar

(10) Patent No.: US 6,955,294 B1
(45) Date of Patent: Oct. 18, 2005

(54) APPARATUS AND METHOD FOR PREVENTING CREDIT CARD FRAUD

(76) Inventor: Mark Seegar, 5601 Trails Edge Dr., Arlington, TX (US) 76017

( * ) Notice: Subject to any disclaimer, the term of this patent is extended or adjusted under 35 U.S.C. 154(b) by 0 days.

(21) Appl. No.: 10/913,636

(22) Filed: Aug. 6, 2004

(51) Int. Cl.$^7$ .............................................. G06K 5/00
(52) U.S. Cl. ...................... 235/380; 235/379; 705/35; 705/38; 705/39; 705/44
(58) Field of Search ............................. 235/380, 379; 705/35, 38, 39, 44

(56) References Cited

U.S. PATENT DOCUMENTS

| | | | |
|---|---|---|---|
| 6,494,367 B1 * | 12/2002 | Zacharias | 235/382 |
| 2002/0047049 A1 * | 4/2002 | Perron et al. | 235/492 |
| 2002/0120563 A1 * | 8/2002 | McWilliam et al. | 705/39 |
| 2002/0164057 A1 * | 11/2002 | Kramer | 382/124 |
| 2003/0001005 A1 * | 1/2003 | Risafi et al. | 235/380 |
| 2003/0216997 A1 * | 11/2003 | Cohen | 705/39 |
| 2004/0007618 A1 * | 1/2004 | Oram et al. | 235/380 |
| 2004/0243498 A1 * | 12/2004 | Duke | 705/35 |

* cited by examiner

Primary Examiner—Jared J. Fureman
Assistant Examiner—Allyson N Trail
(74) Attorney, Agent, or Firm—James E. Walton

(57) ABSTRACT

A trigger card and system for preventing credit and debit card fraud is disclosed. The trigger card is adapted to be indistinguishable from typical credit cards and other cards issued by financial institutions. The system is adapted to receive signals when a standard card reader reads the trigger card. The system is further adapted to initiate an automated procedure to reduce fraud upon receipt of the signal indicating that the trigger card has been read by the card reader.

26 Claims, 2 Drawing Sheets

APPARATUS AND METHOD FOR PREVENTING CREDIT CARD FRAUD

BACKGROUND OF THE INVENTION

1. Field of the Invention

The present invention relates to devices for the prevention of credit card fraud.

2. Description of Related Art

It is well known that credit card fraud is a major problem in the credit card industry. Such fraud is achieved in many ways, one method being the theft of a cardholder's wallet or purse and the subsequent unauthorized usage of the credit cards and debit cards stored therein. Often, stolen credit cards are used within the first few hours of the theft. Most credit card fraud is detected before the cardholder knows there is a problem. Adding to this problem is the fact that most cardholders carry more than one credit card. Often, the cardholder does not even know how many or which cards he is carrying, and most cardholders do not keep a separate list of all of their credit and debit cards. Credit card companies often end up paying for the majority of unauthorized usage. This reduces the credit card companies' profits and leads to increased fees for cardholders.

Because cardholders often carry more than one credit or debit card, even if one credit card company notices irregular purchases on the credit card and restricts the use of that particular credit or debit card, the fraud continues because the thief simply switches to another credit card in the wallet or purse. Because the cards are usually issued by different companies, it is unlikely that the fraudulent use of one card will be reported to the issuing companies of the other cards. Thus, even if the theft is noticed by the cardholder, it is very difficult and time consuming to contact every financial institution that has issued a credit or debit card to the cardholder.

These methods of restricting the use of credit cards are not without their problems. Computerized monitoring systems occasionally restrict the valid use of a credit card merely when the cardholder's purchasing habits change. For instance, it is possible for a generally frugal shopper to have their credit card locked by the issuing company when the cardholder goes on an unusual shopping spree or travels to an unusual location. The prospect of angering customers by such mistakes makes automated monitoring an undesirable alternative of fraud protection for most credit card companies.

One proposed solution is for the cardholder to register all of his credit, debit, and other financial institution cards under a single credit card fraud protection plan. This allows the plan administrator to contact the credit card issuers in the event a fraud or theft is reported to the plan administrator by the cardholder. Although such credit card fraud protection plans offer a valuable service to the cardholder, it is still incumbent upon the cardholder to realize that a theft or fraud has taken place and to notify the plan administrator. Unfortunately, the theft is usually not realized until several hours or days have passed. This is true for many different reasons, including: the theft occurs while the cardholder is sleeping; the cards are stolen from the cardholders home while the cardholder is away or out of town; the thief only steals the cards, and not the entire wallet or purse; the cards are not actually stolen, but the numbers, expiration dates, and code numbers are copied for use over the phone or the Internet; and a wide variety of other reasons.

Therefore, although there have been significant developments in the area of credit card fraud prevention, considerable shortcomings remain.

SUMMARY OF THE INVENTION

There is a need for credit card fraud prevention system that provides an immediate and reliable indication that theft, fraud, or unauthorized use has occurred. There is also a need for a system which increases the arrest rate for credit card theft.

Therefore, it is an object of the present invention to provide an apparatus and method for preventing and reducing credit card fraud that provides an immediate and reliable notification that theft, fraud, or unauthorized use of a credit, debit, or financial institution card has occurred, and that provides an immediate procedure for canceling and reordering credit cards. It is a further object to provide a system that provides an increase in the arrest rate for credit card theft.

These objects are achieved by providing a trigger card that looks and feels like a credit card and that is carried by a cardholder along with his other credit and debit cards. Although the trigger card looks and feels like a regular credit card, any attempted use of the trigger card immediately signals the theft, fraud, or unauthorized use of the card and sets a variety of systems into action. The first system triggered by use of the trigger card is one that immediately cancels all credit and debit cards stored on a list of cards provided by the cardholder. A second system, which is optional, that is triggered by the use of the trigger card is a law-enforcement system that gathers information about the unauthorized user. This second system may include having the clerk request further identification in the form of a state-issued identification card or biometric data, such as a fingerprint. A third system triggered by the use of the trigger card is one that notifies various agencies, personnel, or third parties who may need to know of the theft, fraud, or unauthorized use. For example, the notification might be sent to state and federal agencies, credit card issuers, banks, relatives, and to personal email or telephone numbers of the cardholder, among other possibilities. A fourth system that is triggered by the use of the trigger card is one that immediately orders and delivers new cards to the cardholder at a pre-designated address by expedited delivery. This pre-designated address can be the cardholder's home address, his business address, or a "safe" address, such as a bank or post office box, or to a temporary address if the cardholder is away from home.

The present invention provides significant advantages, including: (1) immediate response to fraud notification in the form of card cancellation, notification, and delivery of new cards; (2) increased reporting of credit card theft; (3) simplified "back-to-normal" status for cardholders; (4) increased collection of data about fraudulent users; (5) reduced false positive notifications of fraud or theft; and (6) significantly reduced losses to credit card issuers and retail entities due to credit card fraud.

Additional objectives, features, and advantages will be apparent in the written description that follows.

BRIEF DESCRIPTION OF THE DRAWINGS

The novel features believed characteristic of the invention are set forth in the appended claims. However, the invention itself, as well as, a preferred mode of use, and further objectives and advantages thereof, will best be understood by reference to the following detailed description when read in conjunction with the accompanying drawings, wherein:

DETAILED DESCRIPTION OF THE PREFERRED EMBODIMENT

The present invention represents the discovery that a trigger card that looks and feels like a credit card, but which is not a credit card, may be placed among actual credit and debit cards in a cardholders wallet or purse to prevent credit card fraud. The trigger card is stored with the cardholder's other financial cards, but not used by the cardholder. Any attempt to use the trigger card as a credit card is a clear indication of theft or fraud; thereby triggering a range of possible responses tailored to reduce fraud. The trigger card and associated system for use will result in more limited fraud exposure and act as a fraud deterrent.

Figure 1:
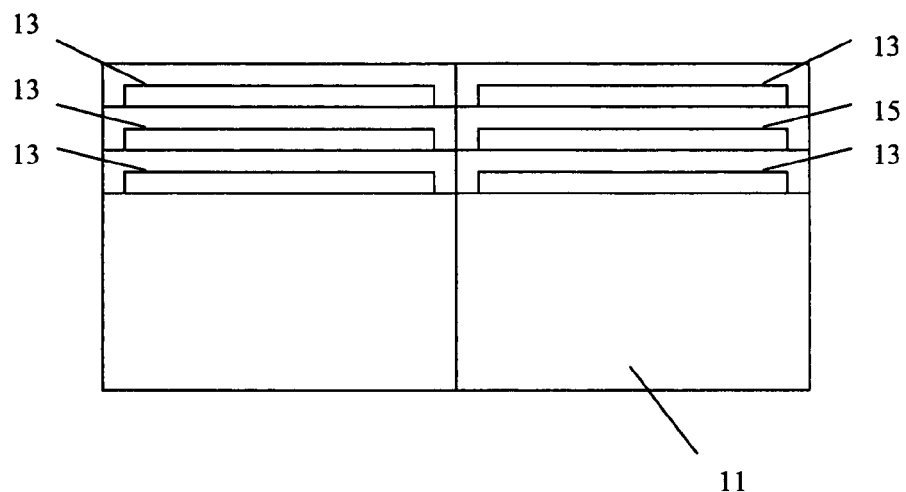
FIG. 1 is a schematic of a wallet storing financial cards and a trigger card according to the present invention.

Referring to FIG. 1 in the drawings, a conventional wallet 11 is shown with financial cards 13. It will be appreciated that wallet 11 also represents purses and other devices, including pouches, money clips, checkbook, pockets, drawers, file cabinet, furniture, automobiles, and safes, used by cardholders to carry and store credit, debit, and other financial institution cards. Financial cards 13 may be credit cards, debit cards, debit cards, automatic teller machine cards, cash value cards, voucher cards, or any card used for financial transactions. As is typical, financial cards 13 include graphical designs, logos of banks, logos of credit card institutions, such as VISA and MASTERCARD, identification names, identification numbers, code numbers, expiration dates, and one or more magnetic strips or other digital memory means for storing digital data.

In accordance with the present invention, a trigger card 15 is carried or stored randomly among financial cards 13. Trigger card 15 looks and feels like a typical financial card, in that trigger card 15 preferably includes graphics, logos of banks, logos of popular credit card institutions, such as VISA and MASTERCARD, identification names, identification numbers, code numbers, expiration dates, and one or more magnetic strips or other digital memory means for storing digital data; however, trigger card 15 is not a financial card. Trigger card 15 is preferably manufactured by the same means as financial-cards 13.

The purpose of trigger card 15 is to fool an unauthorized user into believing that trigger card 15 is a valid credit card. Thus, it is preferred that trigger card 15 not be identical to any other financial card 13 in wallet 11, but should look as much like a regular credit card as every other financial card 13 in wallet 11. The importance of this is two fold: first, the user should be able to easily avoid using trigger card 15; second, most cardholders do not have two identical cards from the same issuer, so the pair would stand out as a possible trigger card 15. Also, many financial cards 13 offer varying levels of membership with varying issuer logos, card designs, and indicators, such as "Platinum Card," "Gold Card," or "Exclusive." These options are available for trigger card 15 to further insure that the trigger card 15 is indistinguishable from a financial card 13 to anyone but the cardholder. Indeed, trigger card 15 may include features or indicia that entice a thief or an unauthorized user to attempt to use trigger card 15 before attempting to use any other financial card 13. If a thief can be enticed into using trigger card 15 first, then, as explained below, as soon as trigger card 15 is used, the cardholder's valid financial cards 13 are cancelled. This prevents any unauthorized or fraudulent transactions on valid financial cards 13.

Figure 2A:
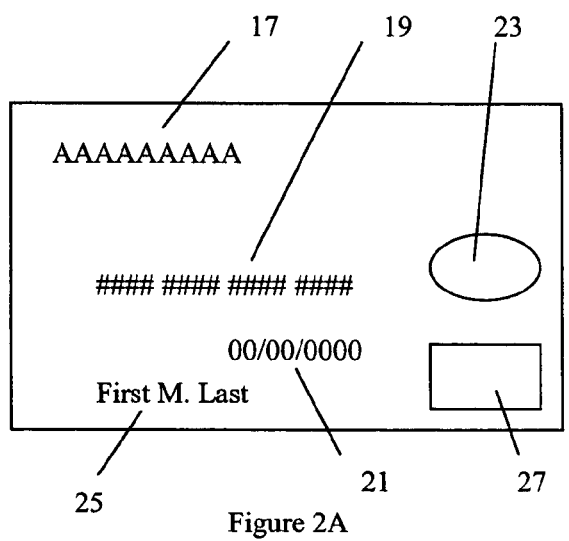
FIG. 2A is a schematic of a front face of a trigger card according to the present invention.
Figure 2B:
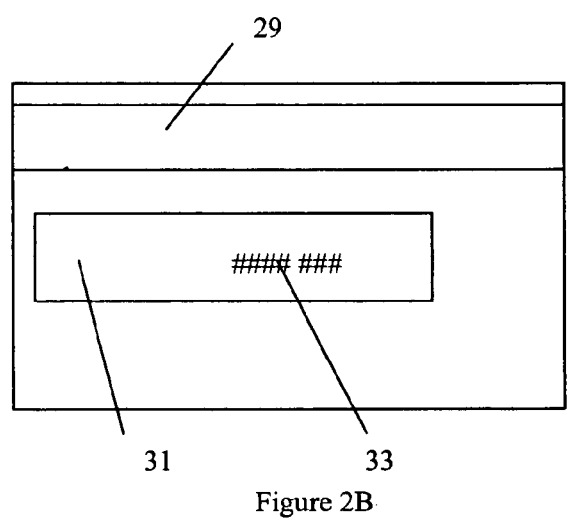
FIG. 2B is a schematic of a rear face of a trigger card according to the present invention.

Referring now to FIGS. 2A and 2B in the drawings, the front and back of a the preferred embodiment of trigger card 15 is shown. As shown in FIG. 2A, the front of trigger card 15 preferably includes typical indicia of a credit or debit card, including a bank logo 17, a 16-digit card number 19, an expiration date 21, a security label 23, such as a hologram, the cardholder's name 25, a credit card institution logo 27, such as VISA or MASTERCARD, and other marketing images. It is important that these indicia look authentic. The back of trigger card 15 is shown in FIG. 2B. Trigger card 15 preferably includes at least one magnetic strip 29 or other means for storing digital trigger data, a signature block 31, and a security code 33. In addition to the need for stealth, as more fully explained below, magnetic strip 29 and card number 19 are needed by trigger card 15 and the associated credit card fraud prevention system of the present invention to communicate that trigger card 15 has been used. For the foregoing reasons, it is preferred that trigger card 15 be manufactured with the same materials and in the same fashion as valid financial cards 13.

It will be appreciated that trigger cards 15 for use in the present invention undergo the same security and usage upgrades over time that regular financial cards undergo. As such, trigger card 15 may include security features that are currently known but not widely used, or may include security or usage features that are not yet known. In other words, trigger card 15 is easily adaptable to keep up with the latest trends in credit card security and usability.

Figure 3:
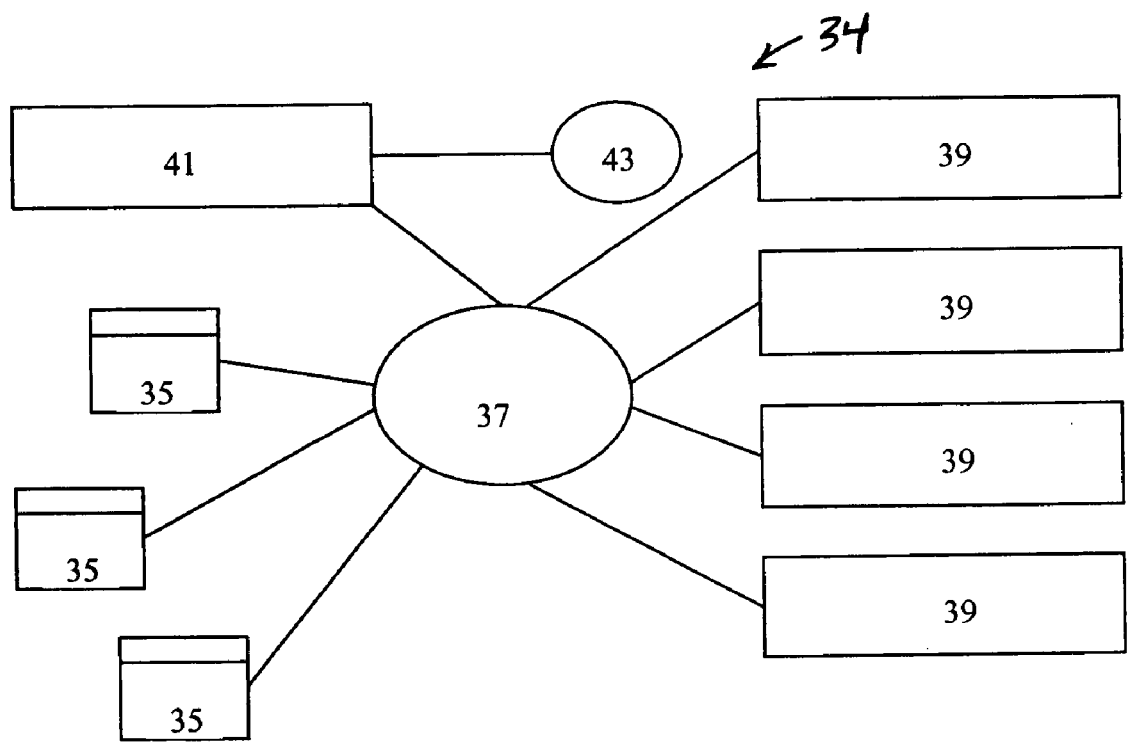
FIG. 3 is a diagram of a system triggered by the trigger card of FIG. 2 according to the present invention.

Referring now to FIG. 3 in the drawings, a system 34 according to the present invention that utilizes trigger card 15 to prevent fraud is illustrated. System 34 includes conventional card readers 35 that are used to read, process, and display the status of financial transactions. Card readers 35 may be point of sale readers, as found at typical sales counters and cash registers, automatic teller machines, and Internet online sales computers. Card readers 35 serve as an interface between financial cards 13 and a system of approval and payment. Upon transfer of information from magnetic strip 29 of financial card 13 to card reader 35, either by manual entry of card number 19, expiration date 21, and/or other data; or by swiping magnetic strip 29 through card reader 35; data about financial card 13 and the current transaction is transmitted to a network 37. Network 37 may be a computer network, telephone network, or any other network suitable for transmitting data. Network 37 transmits the data to one or more issuing institutions 39. Issuing institutions 39 may be banks, financial services companies, or other institutions or agencies. Issuing institutions 39 evaluate the requested transaction and reply through network 37 to card reader 35, either approving or denying the transaction. For card readers 35 located at point of sale counters and cash registers, the approval or denial by issuing institution 39 may be appropriately displayed on a display of card reader 35.

According to the present invention, if trigger card 15 is used instead of financial card 13, card reader 35 transmits selected data stored on magnetic strip 29 over network 37 to a trigger computer 41. Trigger computer 41 may be located at issuing institution 39 or may be located at a remote location. It will be appreciated that the data from trigger card 15 may be sent from card reader 35 through network 37 to trigger computer 41, from issuing institution 39 through network 37 to trigger computer 41, from institution 39 directly to trigger computer 41, or directly from card reader 35 directly to trigger computer 41. Variations in the order or direction of transmission of the data from trigger card 15 may be easily controlled by appropriate programming on system 34. In the preferred embodiment, trigger computer 41 is programmed to initiate certain anti-fraud procedures based upon the receipt of data indicating an attempted use of trigger card 15.

The procedures initiated by trigger computer 41 include a data acquisition procedure, a card cancellation procedure, a notification procedure, and a card ordering procedure. The cancellation procedure includes the immediate and automatic canceling of all financial cards 13 that have been previously chosen and listed by the cardholder to be cancelled by system 34 in the event trigger card 15 is ever used. Alternatively, the spending limits on the associated financial cards 13 may be severely reduced to allow tracing of the fraudulent use and to allow continued limited use in the event of an accidental use of the trigger card 15.

The data acquisition procedure occurs immediately after trigger card 15 is swiped at a card reader 35 or after the data from trigger card 15 is submitted in an online transaction. In the preferred embodiment, the method and location of use is recorded and transmitted to trigger computer 41, or other computers dedicated to the carrying out of the various procedures of the invention. The data acquisition procedure may be enhanced in several ways upon the use of trigger card 15, such as by trigger computer 41 informing card reader 35 that an official identification card (ID) is required to continue with the transaction. Trigger card 15 and/or magnetic strip 29 may include certain biometric data about the cardholder, such as fingerprint, retinal scan, facial scan, palm print, etc. As such, trigger computer 41 may transmit a request that the user of trigger card 15 submit such information. As such requests for biometric data become more commonplace, such requests may not necessarily alarm a thief that trigger card 15 has been used.

It should be appreciated that in one embodiment of the invention the data acquisition procedure may allow for a transaction to occur at a low cost to increase the likelihood of capturing the thief. For instance, if trigger card 15 is used at a location with poor data acquisition characteristics, such as a remote automatic teller machine with a low quality camera, a withdrawal may be allowed so that the thief may use the trigger card 15, or any of the associated financial cards 13, at a location with better data acquisition equipment, such as at a store with a finger print scanner. Such options may be at the issuer's discretion depending on the importance of catching every thief, or may be an option selected by the cardholder as an extra protection feature.

Because of the common usage of financial cards 13, in one embodiment of the invention, a disable code for canceling the mistaken usage of trigger card 15 by the cardholder may be provided. An example may be the entry of a code within a certain time limit after using the trigger card 15, such as within thirty seconds after usage. This additional feature would not delay the response of the trigger computer 41 unduly, but would allow the cardholder some ability to recover from the mistaken use of trigger card 15.

The notification procedure preferably requires that trigger computer 41 be connected to an external network 43 for automated communication to the cardholder and any other listed parties. For example, trigger computer 41 could send an email notification to the cardholder. Additionally, if the cardholder wishes to list other email addresses to be notified, an email may be sent to the card holder's spouse, children, attorney, company, security service, or any other entity that the card holder would want notified of the use of the trigger card 15. Likewise, an automated telephone message may be sent to a list of numbers selected by the cardholder. The message may be computer generated, including the date, time, and location of the unauthorized use of trigger card 15. Additionally, any automated communication may include a personal message pre-recorded by the card holder, such as an introduction to the email, or a voice message added to the telephone notification. Additionally, the notification may include notification of the proper authorities or an appropriate law-enforcement agency based upon the location of the unauthorized use.

The card ordering procedure includes immediate ordering and delivery of replacement financial cards 13 for all financial cards 13 that were cancelled by system 34 and issuance of a new trigger card 15. Delivery may be automatic to a home address, a business address, or a "safe" address, such as a bank or post office box, or to a temporary address if the cardholder is away from home, or delivery of the replacement financial cards 13 may be deferred until the cardholder has replied to the notification. While home delivery tends to be safest, this may be of no help when the cardholder is traveling. Therefore, home delivery may be initiated immediately, or delivery may be delayed pending confirmation of the cardholder's location. This confirmation may be automated by email, text messaging, web page entry, or telephone, for example. Alternatively, the confirmation may be handled by personal communication, such as over the telephone or in person at a financial institution, to ensure that no continuing fraud is perpetrated by the theft of a communication device along with trigger card 15.

In one embodiment of the present invention, one method for associating financial cards 13 with trigger card 15 is to provide a specially adapted card reader 35 inside a financial institution, such as a bank lobby. The cardholder simply swipes trigger card 15 in the special card reader 35 and initiates a signup menu instead of a transaction menu. The cardholder then swipes any financial cards 13 that need to be associated with the trigger card 15. This procedure might require a code to prevent a thief from swiping various financial cards 13 in an attempt to find a trigger card 15.

It is apparent that an invention with significant advantages has been described and illustrated. Although the present invention is shown in a limited number of forms, it is not limited to just these forms, but is amenable to various changes and modifications without departing from the spirit thereof.

I claim:

1. An anti-fraud trigger card, comprising:
   front and rear faces;
   graphical indicia disposed on the front and rear faces to produce an illusion that the trigger card is a valid financial card; and
   at least one magnetic strip on the rear face for storing digital trigger data;
   wherein the trigger card is not and cannot be a financial card.

2. The trigger card according to claim 1, wherein the graphical indicia comprises:
   a cardholder name;
   a credit card number; and
   an expiration date.

3. The trigger card according to claim 1, wherein selected anti-fraud procedures are instigated upon swiping of the magnetic strip through a magnetic strip card reader.

4. The trigger card according to claim 3, wherein the anti-fraud procedures include a data acquisition procedure in which data corresponding to use of the trigger card is transmitted over a network in response to the swiping of the magnetic strip through the magnetic strip card reader.

5. The trigger card according to claim 3, wherein the anti-fraud procedures include a card cancellation procedure in which financial cards associated with the trigger card are cancelled in response to the swiping of the magnetic strip through the magnetic strip card reader.

6. The trigger card according to claim 3, wherein the anti-fraud procedures include a notification procedure in which selected parties are notified in response to the swiping of the magnetic strip through the magnetic strip card reader that the trigger card has been swiped through the magnetic strip card reader.

7. The trigger card according to claim 3, wherein the anti-fraud procedures include a card ordering procedure in which replacement financial cards associated with the trigger card are ordered in response to the swiping of the magnetic strip through the magnetic strip card reader.

8. The trigger card according to claim 7, wherein the card ordering procedure includes a procedure in which the replacement financial cards are delivered to a selected location.

9. The trigger card according to claim 1, wherein selected anti-fraud procedures are instigated in response to the transmission of the digital trigger data over a network to a card reading computer.

10. The trigger card according to claim 9, wherein the anti-fraud procedures include a data acquisition procedure in which data corresponding to use of the trigger card is transmitted over the network in response to the transmission of the digital trigger data over the network to the card reading computer.

11. The trigger card according to claim 9, wherein the anti-fraud procedures include a card cancellation procedure in which financial cards associated with the trigger card are cancelled in response to the transmission of the digital trigger data over the network to the card reading computer.

12. The trigger card according to claim 9, wherein the anti-fraud procedures include a notification procedure in which selected parties are notified in response to the transmission of the digital trigger data over the network to the card reading computer that the digital trigger data has been transmitted over the network to a card reading computer.

13. The trigger card according to claim 9, wherein the anti-fraud procedures include a card ordering procedure in which replacement financial cards associated with the trigger card are ordered in response to the transmission of the digital trigger data over the network to the card reading computer.

14. The trigger card according to claim 13, wherein the card ordering procedure includes a procedure in which the replacement financial cards are delivered to a selected location.

15. A system for preventing financial card fraud, the system comprising:
a trigger card adapted to be indistinguishable from a financial card; and
a trigger computer adapted to receive a signal when a financial card reader reads the trigger card, the trigger computer being further adapted to initiate selected anti-fraud procedures in response to the signal;
wherein the trigger card is not and cannot be a financial card.

16. The system according to claim 15, wherein the trigger card comprises:
front and rear faces;
graphical indicia disposed on the front and rear faces to produce an illusion that the trigger card is a valid financial card; and
at least one magnetic strip on the rear face for storing digital trigger data.

17. The system according to claim 15, wherein the graphical indicia comprises:
a cardholder name;
a credit card number; and
an expiration date.

18. The system according to claim 15, further comprising:
a computer network adapted to transmit the signal from the financial card reader to the trigger computer.

19. The system according to claim 15, wherein the anti-fraud procedures include at least one procedure from the group of procedures consisting of a data acquisition procedure, a card cancellation procedure, a notification procedure, and a card ordering procedure.

20. A method for preventing financial fraud, the method comprising the steps of:
providing a trigger card having front and rear faces, graphical indicia disposed on the front and rear faces to produce an illusion that the trigger card is a valid financial card, and at least one magnetic strip on the rear surface for storing digital trigger data, wherein the trigger card is not and cannot be a financial card;
associating valid financial cards with the trigger card;
monitoring financial card transactions; and
initiating selected anti-fraud procedures in response to an attempted use of the trigger card as a financial card.

21. The method according to claim 20, wherein the anti-fraud procedures include a data acquisition procedure in which data corresponding to the use of the trigger card is transmitted to a trigger computer.

22. The method according to claim 20, wherein the anti-fraud procedures include a card cancellation procedure in which the valid financial cards associated with the trigger card are cancelled in response to the attempted use of the trigger card.

23. The method according to claim 20, wherein the anti-fraud procedures include a notification procedure in which selected parties are notified in response to the attempted use of the trigger card.

24. The method according to claim 20, wherein the anti-fraud procedures include a card ordering procedure in which replacement valid financial cards are ordered in response to the attempted use of the trigger card.

25. The method according to claim 24, wherein the card ordering procedure includes a procedure in which the replacement financial cards are delivered to a selected location.

26. The method according to claim 24, wherein the card ordering procedure includes a procedure in which a replacement trigger card is delivered to a selected location.

* * * * *